United States Patent
Uruno et al.

(10) Patent No.: US 8,207,717 B2
(45) Date of Patent: Jun. 26, 2012

(54) BUCK-BOOST DC-DC CONVERTER WITH AUXILIARY INDUCTORS FOR ZERO CURRENT SWITCHING

(75) Inventors: Junpei Uruno, Tokai (JP); Hiroyuki Shoji, Hitachi (JP); Yasuo Kaminaga, Hitachi (JP); Akihiko Kanouda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/888,893

(22) Filed: Sep. 23, 2010

(65) Prior Publication Data

US 2011/0013437 A1 Jan. 20, 2011

Related U.S. Application Data

(63) Continuation of application No. 11/876,826, filed on Oct. 23, 2007, now abandoned.

(30) Foreign Application Priority Data

Oct. 25, 2006 (JP) .................................. 2006-290187

(51) Int. Cl.
*G05F 1/618* (2006.01)
(52) U.S. Cl. ....................... 323/262; 323/225; 363/56.12
(58) Field of Classification Search .................. 323/262, 323/225, 259, 235, 261, 319, 271; 363/21.03, 363/56.12
See application file for complete search history.

(56) References Cited

U.S. PATENT DOCUMENTS

| 6,188,588 B1 | 2/2001 | Hemena |
| 2006/0055384 A1 | 3/2006 | Jordan |
| 2006/0176719 A1 | 8/2006 | Uruno |

FOREIGN PATENT DOCUMENTS

| JP | 06-311738 | 11/1994 |
| JP | 2005-318766 | 11/2005 |
| JP | 2006-014454 | 1/2006 |
| JP | 2006-223008 | 8/2006 |
| JP | 2007-282376 | 10/2007 |
| JP | 2008-109775 | 5/2008 |

OTHER PUBLICATIONS

G. Bascope, et al., "Single-Phase High Power Variable Output Voltage Rectifier, Using the Buck+Boost Converter: Control Aspects, Design and Experimentation", Federal University of Santa Catarina, Department of Electrical Engineering.
Y. Tsuruta, et al., "Proposal of 98.5% High Efficiency Chopper Circuit QRAS for the Electrical Vehicle and the Verification", IEEJ Trans. IA, vol. 125, N. 11, 2005.

*Primary Examiner* — Harry Behm
(74) *Attorney, Agent, or Firm* — Antonelli, Terry, Stout & Kraus, LLP.

(57) ABSTRACT

A unidirectional DC-DC converter and method of control thereof. The converter includes a DC power-supply, a buck converter circuit having a first main switching element, a boost converter circuit having a second main switching element, a first snubber capacitor, a first inversely-parallel diode, a control device, and an output diode.

6 Claims, 10 Drawing Sheets

Va-b > Ve-b : BUCK
Va-b ≤ Ve-b : BOOST

BUCK-BOOST DC-DC CONVERTER WITH AUXILIARY INDUCTORS FOR ZERO CURRENT SWITCHING

CROSS REFERENCE TO RELATED APPLICATION

This application is a continuation of U.S. application Ser. No. 11/876,826, filed Oct. 23, 2007 now abandoned, the contents of which are incorporated herein by reference.

BACKGROUND OF THE INVENTION

The present invention relates to a unidirectional DC-DC converter for converting an inputted DC voltage into a DC voltage of different magnitude, and a controlling method therefor.

In a buck-boost DC-DC converter for outputting an inputted DC voltage such that this inputted DC voltage is converted into a DC voltage of desired magnitude, implementation of high efficiency in this converter is made possible by lowering the switching loss with the use of soft switching technology. In accompaniment with this implementation, passive elements, such as inductor and capacitor, can be downsized by achieving implementation of high frequency in the driving frequency for switching elements.

In Grover Victor Torrico Bascope, "Single-Phase High Power Factor Variable Output Voltage Rectifier, Using the Buck+Boost Converter: Control Aspects, Design and Experimentation", the following unidirectional DC-DC converter is disclosed: A buck converter and a boost converter, which co-use a main inductor, are connected in series with each other. Then, the buck converter and the boost converter are selectively driven, depending on a comparison result as to which is larger of an input voltage and an output voltage. The basic configuration of the main circuit includes, first, a DC power-supply and a buck converter circuit, the buck converter circuit including a first main switching element for intermittently intercepting and connecting a current flowing into a DC load via the main inductor from the DC power-supply. The basic configuration includes, next, a boost converter circuit, the boost converter circuit including a second main switching element for short-circuiting the DC load, and intermittently intercepting and connecting a current in a circuit for accumulating energy into the main inductor from the DC power-supply. Here, first and second snubber capacitors are connected in parallel to the first and second main switching elements each. Also, diodes are connected in inversely parallel to the first and second main switching elements each. Moreover, the basic configuration further includes a control device for turning ON/OFF the first and second main switching elements, and controlling duties of the main switching elements, and an output diode for releasing the energy accumulated into the main inductor onto the load side by the ON/OFF operation of the main switching elements.

Next, in Tsuruta et al., "Proposal of 98.5% High Efficiency Chopper Circuit QRAS for the Electric Vehicle and the Verification", IEEJ Trans. IA, Vol. 125, No. 11, 2005, the following zero-current switching (ZCS) scheme is disclosed: In a unidirectional DC-DC converter of boost-chopper type, current change ratios of main switching elements are suppressed by an inductor.

Also, in JP-A-2005-318766, a soft-switching-capable unidirectional DC-DC converter is disclosed. Here, after main switching elements are directly connected to a DC power-supply, an auxiliary resonant circuit including an auxiliary switching element is connected to a DC circuit of the DC power-supply and the main switching elements in a buck converter circuit where an inductor and a load are connected in series.

Also, in JP-A-2006-14454, the following technology is disclosed: As is the case with JP-A-2005-318766, in a buck converter circuit, an auxiliary resonant circuit including an auxiliary switching element and a transformer is connected to a DC circuit of a DC power-supply and main switching elements.

Meanwhile, JP-A-6-311738, the following technology is disclosed: In a unidirectional DC-DC converter having a boost converter circuit, a DC circuit of an auxiliary switching element, auxiliary inductors, and a diode is connected to a DC circuit of a DC power-supply and main to switching elements. Here, the auxiliary inductors are magnetically coupled to a main inductor. Also, the auxiliary switching element is turned ON before the main switching elements are turned ON.

By the way, if no modification is made to the main circuit of the unidirectional DC-DC converter which is disclosed in Grover Victor Torrico Bascope, "Single-Phase High Power Factor Variable Output Voltage Rectifier, Using the Buck+Boost Converter: Control Aspects, Design and Experimentation", switching losses in the main switching elements are tremendous in amount. As a result, there exists a drawback that the implementation of high frequency is difficult to achieve, and that the device dimension becomes large.

Meanwhile, in the main circuit configurations of the unidirectional DC-DC converters, each of which is disclosed in Tsuruta et al., "Proposal of 98.5% High Efficiency Chopper Circuit QRAS for the Electric Vehicle and the Verification", IEEJ Trans. IA, Vol. 125, No. 11, 2005, JP-A-2005-318766, JP-A-2006-14454, and JP-A-6-311738, control ranges of the output voltages are biased into some range or other with respect to the DC power-supply voltage. This shortcoming limits application targets to which the main circuit configurations are applicable. Namely, in the boost converter circuits disclosed in JP-A-2005-318766 and JP-A-2006-14454, there exists a drawback that no control cannot be exerted over the output voltages which are lower than the DC power-supply voltage. Also, in the buck converter circuits disclosed in Tsuruta et al., "Proposal of 98.5% High Efficiency Chopper Circuit QRAS for the Electric Vehicle and the Verification", IEEJ Trans. IA, Vol. 125, No. 11, 2005, and JP-A-6-311738, there exists a drawback that no control cannot be exerted over the output voltages which are higher than the DC power-supply voltage.

Also, in JP-A-2005-318766 and JP-A-2006-14454, from their basic principle, the large inductors, each of which is equivalent to more than one-half of the main inductor, are required as the resonating (auxiliary) inductors. As a result, there exists a drawback that dimension/weight of the auxiliary inductors become increased.

Moreover, in JP-A-2006-14454, there also exists a drawback that, from the use of the transformer and its relationship with the circuit configuration, occurrence of voltage surge is feared due to influences of leakage inductance.

SUMMARY OF THE INVENTION

It is an object of the present invention to provide a DC-DC converter for implementing a secure soft switching over a wide voltage control range.

Also, it is another object of the present invention to provide a DC-DC converter for allowing a reduction in the dimension/weight of auxiliary inductors, and allowing implementation of the large capacity, the auxiliary inductors being designed for implementing a secure soft switching over a wide voltage control range.

In the present invention, its one aspect is as follows: A buck converter circuit and a boost converter circuit, which co-use a main inductor, are connected in series with each other between a DC power-supply and a DC load. Moreover, utilizing energy accumulated into first and second auxiliary inductors which are magnetically coupled to the main inductor, a current is flown through diodes during a short time-period including a point-in-time at which main switching elements of the buck and boost converter circuits are to be turned ON. Here, the diodes are connected in inversely parallel to the main switching elements.

In a preferred embodiment of the present invention, the first and second auxiliary inductors are loosely coupled to the main inductor magnetically.

In the present invention, its another aspect is as follows: A unidirectional DC-DC converter, including a DC power-supply, a buck converter circuit, the buck converter circuit including a first main switching element for intermittently intercepting and connecting a current flowing into a DC load via a main inductor from the DC power-supply, a boost converter circuit, the boost converter circuit including a second main switching element for short-circuiting the DC load, and intermittently intercepting and connecting a current in a circuit for accumulating energy into the main inductor from the DC power-supply, first and second snubber capacitors connected in parallel to the first and second main switching elements each, first and second inversely-parallel diodes connected in inversely parallel to the first and second main switching elements each, a control device for turning ON/OFF the first and second main switching elements, and controlling duties of the main switching elements, and an output diode for releasing the energy onto the load side by the ON/OFF operation of the main switching elements, the energy being accumulated into the main inductor, wherein the unidirectional DC-DC converter further includes a DC circuit of a first auxiliary switching element and a first auxiliary inductor, the first auxiliary inductor being magnetically coupled to the main inductor, the DC circuit being connected in parallel to the first main switching element, and a DC circuit of a second auxiliary switching element and a second auxiliary inductor, the second auxiliary inductor being magnetically coupled to the main inductor, the DC circuit being connected in parallel to the second main switching element.

In a preferred embodiment of the present invention, the first and second auxiliary inductors are loosely coupled to the main inductor magnetically.

Also, in a preferred embodiment of the present invention, there is further provided a control unit for turning ON the first and second auxiliary switching elements during a short time-period including a point-in-time at which the corresponding first and second main switching elements are to be turned ON, and flowing a forward-direction current through the corresponding first and second inversely-parallel diodes.

According to a preferred embodiment of the present invention, it becomes possible to implement a secure soft switching in a wide voltage control range ranging from an area lower than a DC power-supply voltage to an area higher than the DC power-supply voltage, and to implement a unidirectional DC-DC converter for allowing implementation of the high frequency and downsizing.

Also, according to a preferred embodiment of the present invention, a loosely-coupled transformer is used, thereby utilizing the leakage inductance positively. This feature makes it possible to provide a unidirectional DC-DC converter for allowing implementation of the soft switching in a more downsized manner.

Moreover, according to a preferred embodiment of the present invention, it becomes possible to provide a DC-DC converter for allowing implementation of the large capacity by optimally controlling continuous mode and discontinuous mode of a power-supply current.

Other objects, features and advantages of the invention will become apparent from the following description of the embodiments of the invention taken in conjunction with the accompanying drawings.

DETAILED DESCRIPTION OF THE EMBODIMENTS

1st Embodiment

First, referring to FIG. 1 and FIG. 2, the explanation will be given below concerning a first embodiment of the present invention.

Figure 1:
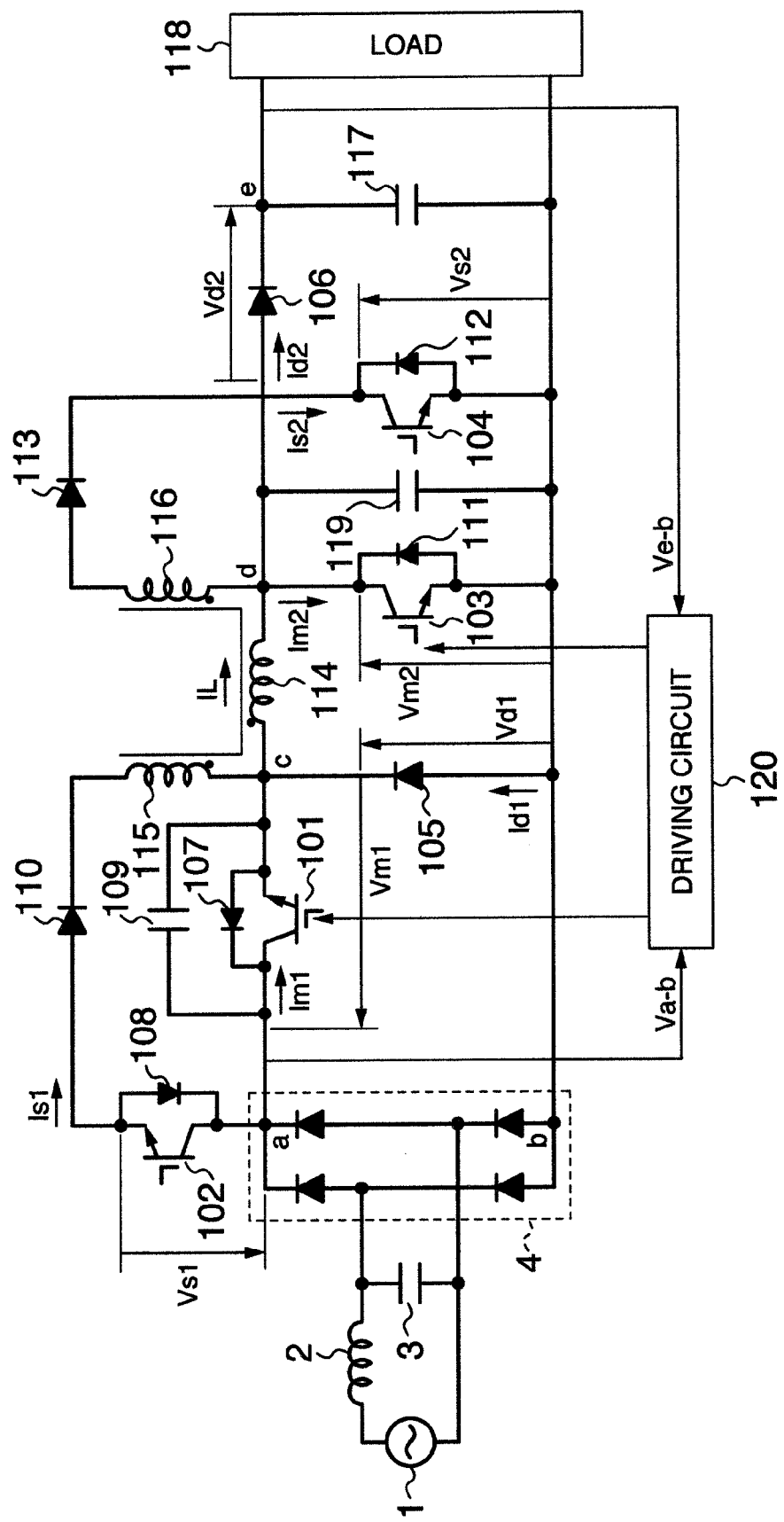
FIG. 1 is a configuration diagram of the main circuit of a unidirectional DC-DC converter according to a first embodiment of the present invention.

FIG. 1 is a configuration diagram of the main circuit of a unidirectional DC-DC converter according to the first embodiment of the present invention. The present embodiment is a unidirectional DC-DC converter of buck-boost type for allowing implementation of both a boost operation for outputting a voltage higher than an inputted voltage and a buck operation for outputting a voltage lower than the inputted voltage.

Explaining the main-circuit configuration in FIG. 1, a DC power-supply is configured with a commercial AC power-supply 1, a filter circuit including an inductor 2 and a capacitor 3, and a rectifier circuit 4. Namely, the entire AC voltage from the commercial AC power-supply 1 is rectified by the rectifier circuit 4 via the filter circuit including the inductor 2 and the capacitor 3, thereby being converted into a smooth DC voltage.

A DC load 118 is connected to the DC power-supply positioned between a-b points, i.e., both ends of the rectifier circuit 4, via an IGBT 101, i.e., a first main switching element, a main inductor 114, and an output diode 106. Also, a reflux diode 105 is connected to a DC circuit of the main inductor 114, the output diode 106, and the DC load 118. A diode 107 is connected in inversely parallel to the first main IGBT 101. Moreover, a snubber capacitor 109 is connected in parallel to the first main IGBT 101. The circuits described so far configure the so-called buck converter.

A DC circuit of the main inductor 114, i.e., a choke coil co-used for the buck-boost operation, and an IGBT 103, i.e., a second main switching element, is connected between c-b points. A diode 111 is connected in inversely parallel to the second main IGBT 103. Moreover, a snubber capacitor 119 is connected in parallel to the second main IGBT 103. The circuits described so far configure the so-called boost converter. In order to extract the output voltage from this boost converter, a DC circuit of the output diode 106 and an output capacitor 117 is connected between d-b points, i.e., both ends of the second main IGBT 103. Both ends of the output capacitor 117 are output terminals of the unidirectional DC-DC converter, to which the DC load 118 is connected.

The above-described configuration is a configuration of a general unidirectional DC-DC converter. In the present embodiment, a zero-voltage and zero-current switching circuit (ZVZCS) is added to this configuration.

Namely, a DC circuit of an IGBT 102, i.e., a first auxiliary switching element, a diode 110, and a first auxiliary inductor 115 is connected between a-c points, i.e., both ends of the IGBT 101, i.e., the first main switching element. A diode 108 is connected in inversely parallel to this first auxiliary IGBT 102 as well.

Furthermore, a DC circuit of a second auxiliary inductor 116, a diode 113, and an IGBT 104, i.e., a second auxiliary switching element, is connected between d-b points, i.e., both ends of the IGBT 103, i.e., the second main switching element. A diode 112 is connected in inversely parallel to this second auxiliary IGBT 104 as well. Also, the first auxiliary inductor 115 and the second auxiliary inductor 116 are loosely coupled to the main inductor 114 magnetically.

A driving circuit 120 monitors and supervises large-or-small relationship between the voltage V a-b established between the a-b points, i.e., the output voltage of the rectifier circuit 4, and the output voltage V e-b established between the e-b points. In accordance with a result identified by this monitoring, the driving circuit 120 exerts a driving control over either the buck converter or the boost converter, as will be explained in FIG. 2 next.

In this driving control, the PWM control is exerted by the AVR control system so that the terminal voltage V e-b of the actual output capacitor 117 coincides with an output (load) voltage instruction V e-b*. This driving control determines timings for ON/OFF of the main switching elements.

Figure 2:
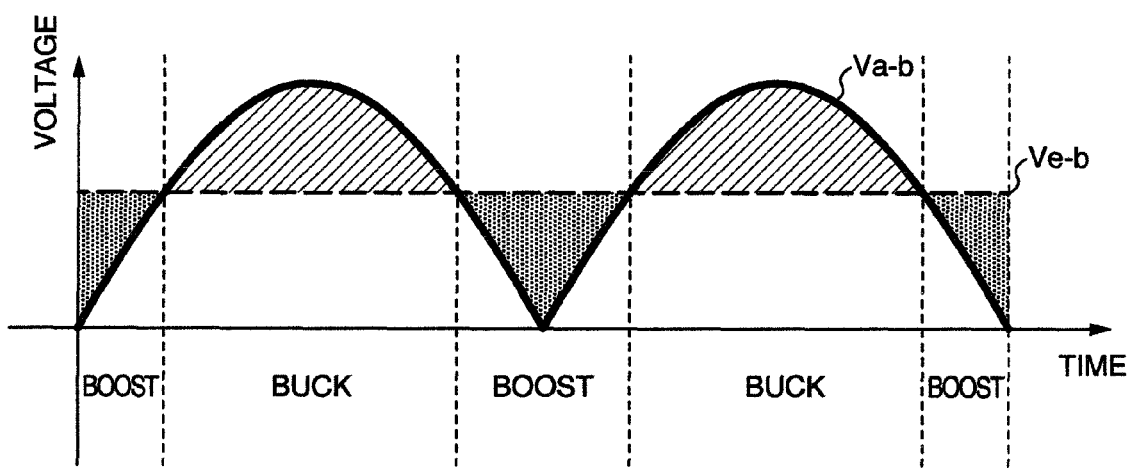
FIG. 2 is an input/output voltage waveform diagram for explaining operation of the first embodiment of the present invention.

FIG. 2 is a voltage waveform diagram for illustrating the manner in the selection of the control modes according to the present embodiment of the present invention. FIG. 2 shows that either of the different operation modes, namely, either the buck converter circuit or the boost converter circuit, will be driven depending on the large-or-small relationship between the inter-a-b voltage V a-b, i.e., the output voltage of the rectifier circuit 4, and the inter-e-b output voltage V e-b.

Figure 3:
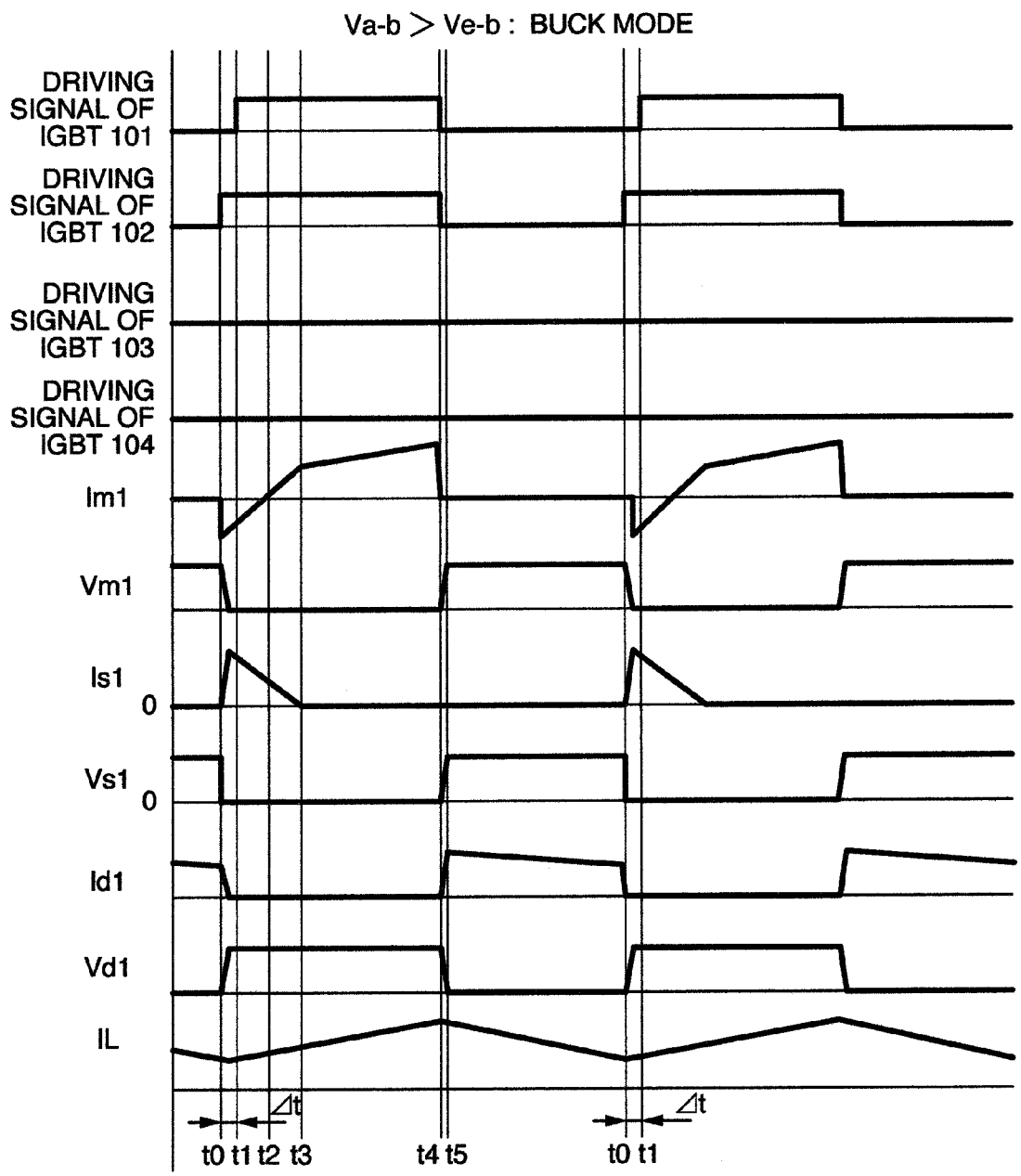
FIG. 3 is a voltage-current waveform diagram (buck mode) of each unit for explaining the operation of the first embodiment of the present invention.
Figure 4:
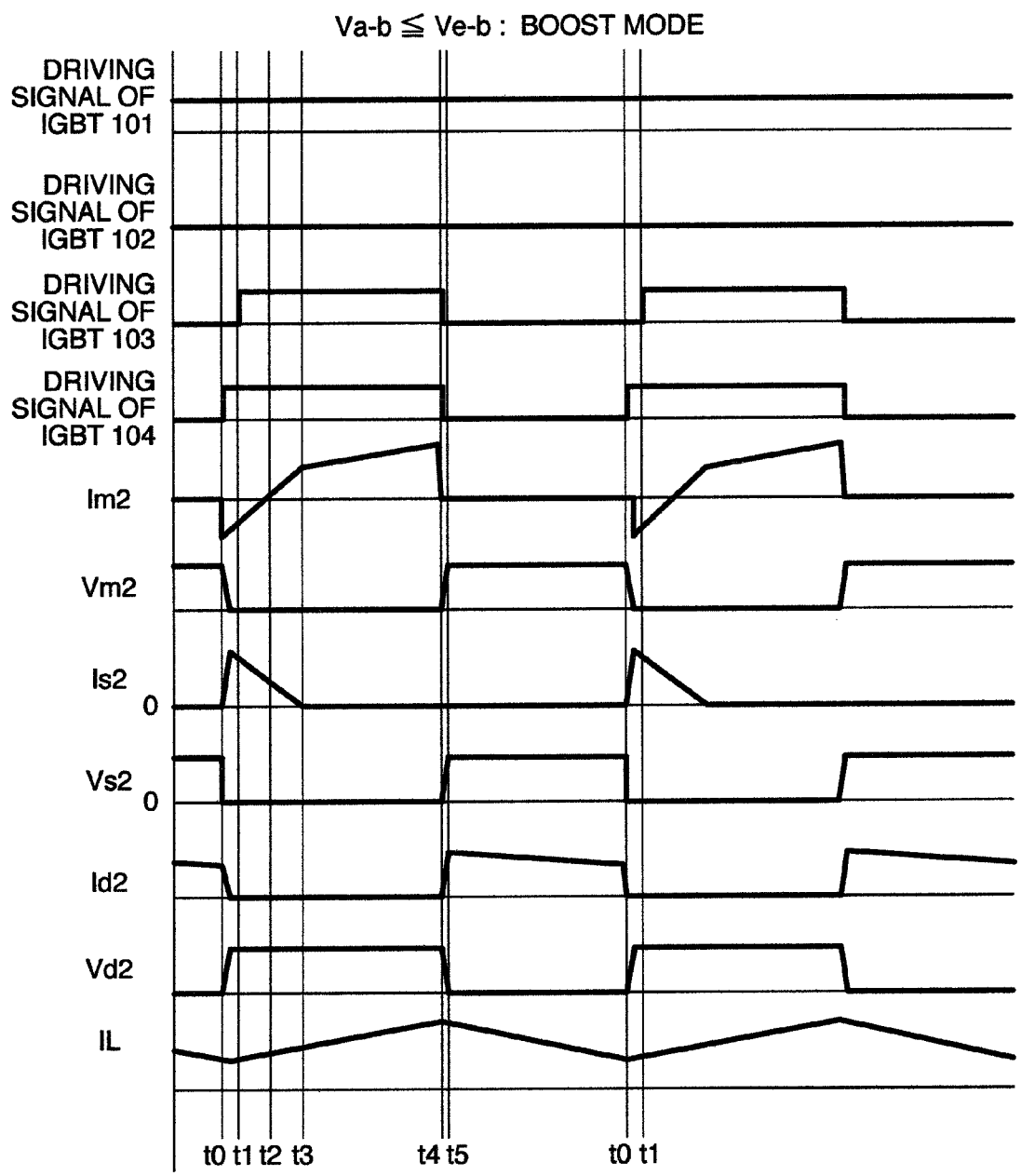
FIG. 4 is a voltage-current waveform diagram (boost mode) of each unit for explaining the operation of the first embodiment of the present invention.

FIG. 3 and FIG. 4 are voltage-current waveform diagrams of each unit for explaining the operation of the first embodiment of the present invention. Referring to FIG. 3 and FIG. 4, the explanation will be given below concerning the operation of the first embodiment. First, based on FIG. 3, the explanation will be given below regarding the operation in a state where the inter-e-b voltage V e-b is lower than the inter-a-b voltage V a-b, i.e., in a case where the unidirectional DC-DC converter is driven in the buck mode. In the case where the DC-DC converter is driven in the buck mode, the second main IGBT 103 and the second auxiliary IGBT 104, which configure the boost converter, are always in the OFF states.

First, prior to a point-in-time t0, no driving signals are applied to gates of the first main IGBT 101 and the first auxiliary IGBT 102. Accordingly, both of the IGBTs are set in the OFF states. At the point-in-time t0, prior to an ON signal of the main IGBT 101 based on the above-described PWM control, a driving signal of the auxiliary IGBT 102 is turned ON. As a result of this, electric charge charged in the snubber capacitor 109 is discharged along a loop of the snubber capacitor 109→the auxiliary IGBT 102→the diode 110→the first auxiliary inductor 115→the snubber capacitor 109, thereby being extracted in this way. The current which will flow at this time, by leakage inductance of the auxiliary inductor 115, becomes a current by zero-current switching (which, hereinafter, will be referred to as "ZCS") in which di/dt is moderate and relaxed. This feature makes it possible to reduce a turn-ON loss of the auxiliary IGBT 102. Meanwhile, by the turn-ON of the auxiliary IGBT 102, energy accumulated into the auxiliary inductor 115 flows a current Is1 along a loop of the auxiliary inductor 115→4 the inversely-parallel diode 107→the auxiliary IGBT 102→the diode 110→the auxiliary inductor 115. On account of this phenomenon, if a driving signal is applied to the main IGBT 101 at a point-in-time t1 which is immediately after the flowing of the current Is1, it turns out that the main IGBT 101 is turned ON during a time-period in which the current is passing trough the inversely-parallel diode 107. Namely, the main IGBT 101 finds it possible to implement zero-voltage switching (which, hereinafter, will be referred to as "ZVS") and the zero-current switching (which, hereinafter, will be referred to as "ZCS"). Consequently, there occurs none of the switching loss which will accompany the turn-ON of the main IGBT 101.

Next, at a point-in-time t2, the current begins to flow in the main IGBT 101. At a point-in-time t3, the current Is1 along the loop of the auxiliary inductor 115→the inversely-parallel diode 107→the auxiliary IGBT 102→the diode 110→the auxiliary inductor 115 ceases to flow. Meanwhile, a current flows along a line of the positive pole a of the DC power-supply→the main IGBT 101→the main inductor 114→the output diode 106→the output capacitor 117→the negative pole b.

Now, at a point-in-time t4, based on the above-described PWM control by the AVR, the gate driving signal of the main IGBT 101 and that of the auxiliary IGBT 102 are turned OFF.

First, when the current flowing in the main IGBT 101 is intercepted, a current flows from the DC power-supply to the snubber capacitor 109 and the main inductor 114 during a time-period from the point-in-time t4 to a point-in-time t5. As a result, inter-collector-emitter voltage of the main IGBT 101 is raised by dv/dt which is determined by capacity of the snubber capacitor 109 and the intercepted current value. Namely, the snubber capacitor 109 makes it possible to moderate and relax dv/dt of the inter-collector-emitter voltage of the main IGBT 101. This allows implementation of the ZVS, thereby making it possible to reduce the turn-OFF loss.

Meanwhile, in the auxiliary IGBT 102, no current flows after the point-in-time t3. Accordingly, no turn-OFF loss occurs in the turn-OFF at the point-in-time t4. The energy accumulated into the main inductor 114 is charged into the output capacitor 117 along a loop of the main inductor 114→the output diode 106→the output capacitor 117→the diode 105→the main inductor 114.

The above-described operation from the point-in-time t0 to the point-in-time t5 is repeated. Here, letting the time difference from the point-in-time t0 to the point-in-time t1 be Δt, the auxiliary IGBT 102 is turned ON by the amount of Δt earlier than the main IGBT 101. This operation extracts the electric charge in the snubber capacitor 109, thereby suppressing the inrush current which is going to flow into the main IGBT 101. A desirable timing for the optimum value of this time difference Δt is a timing at which the main IGBT 101 is turned ON at an instant when the inter-collector-emitter voltage of the main IGBT 101 becomes equal to zero. This timing makes it possible to enhance the efficiency up to the highest.

Next, the explanation will be given below regarding the operation in a state where the inter-e-b voltage V e-b is higher than the inter-a-b voltage V a-b, i.e., in a case where the unidirectional DC-DC converter is driven in the boost mode.

FIG. 4 illustrates an operation waveform in the boost mode in the first embodiment of the present invention. In the case where the DC-DC converter is driven in the boost mode, the first main IGBT 101 is always set in the ON state, and the first auxiliary IGBT 102 is always set in the OFF state.

First, prior to a point-in-time t0, no driving signals are applied to gates of the second main IGBT 103 and the second auxiliary IGBT 104. Accordingly, both of the IGBTs are in the OFF states. At the point-in-time t0, prior to an ON of the main IGBT 103 at a point-in-time t1, a driving signal of the auxiliary IGBT 104 is turned ON. As a result of this, electric charge charged in the snubber capacitor 119 is discharged along a loop of the snubber capacitor 119→the second auxiliary inductor 116→the diode 113→the auxiliary IGBT 104→the snubber capacitor 119, thereby being extracted in this way. The current which will flow at this time, by leakage inductance of the auxiliary inductor 116, becomes a current by the ZCS in which di/dt is moderate and relaxed. This feature makes it possible to reduce a turn-ON loss of the auxiliary IGBT 104. Meanwhile, by the turn-ON of the auxiliary IGBT 104, energy accumulated into the auxiliary inductor 116 flows a current Is2 along a loop of the auxiliary inductor 116→the diode 113→the auxiliary IGBT 104→the inversely-parallel diode 111→the auxiliary inductor 116. On account of this phenomenon, if a driving signal is applied to the main IGBT 103 at the point-in-time t1 which is immediately after the flowing of the current Is2, it turns out that the main IGBT 103 is turned ON during a time-period in which the current is passing trough the inversely-parallel diode 111. Namely, the main IGBT 103 finds it possible to implement the ZVS and the ZCS. Consequently, there occurs none of the switching loss which will accompany the turn-ON of the main IGBT 103.

Next, at a point-in-time t2, the current begins to flow in the main IGBT 103. At a point-in-time t3, the current Is2 along the loop of the auxiliary inductor 116→the diode 113→the auxiliary IGBT 104→the inversely-parallel diode 111→the auxiliary inductor 116 ceases to flow. Meanwhile, a current flows along a line of the positive pole a of the DC power-supply→the main IGBT 101→the main inductor 114→the main IGBT 103→the negative pole b.

At a point-in-time t4, the gate driving signal of the main IGBT 103 and that of the auxiliary IGBT 104 are turned OFF. First, when the current flowing in the main IGBT 103 is intercepted, a current flows from the DC power-supply to the main IGBT 101, the main inductor 114, and the snubber capacitor 119 during a time-period from the point-in-time t4 to a point-in-time t5. As a result, inter-collector-emitter voltage of the main IGBT 103 is raised by dv/dt which is determined by capacity of the snubber capacitor 119 and the intercepted current value. Namely, the snubber capacitor 119 makes it possible to moderate and relax dv/dt of the inter-collector-emitter voltage of the main IGBT 103. This allows implementation of the ZVS, thereby making it possible to reduce the turn-OFF loss. Meanwhile, in the auxiliary IGBT 104, no current is flowing after the point-in-time t3. Accordingly, no turn-OFF loss occurs in the turn-OFF of the auxiliary IGBT 104 at the point-in-time t4. The energy accumulated into the main inductor 114 is charged into the output capacitor 117 along a loop of the main inductor 114→the output diode 106→the output capacitor 117→the negative pole b→the diode 105→the main inductor 114.

The above-described operation from the point-in-time t0 to the point-in-time t5 is repeated. Here, letting the time difference from the point-in-time t0 to the point-in-time t1 be Δt, the auxiliary IGBT 104 is turned ON by the amount of Δt earlier than the main IGBT 103. This operation extracts the electric charge in the snubber capacitor 109, thereby suppressing the inrush current which is going to flow into the main IGBT 103. A desirable timing for the optimum value of this time difference Δt is a timing at which the main IGBT 103 is turned ON at an instant when the inter-collector-emitter voltage of the main IGBT 103 becomes equal to zero. This timing results in the highest efficiency.

In the operation explained so far, as was explained referring to FIG. 2, either the buck converter circuit or the boost converter circuit is selected depending on the large-or-small relationship between the inter-a-b voltage V a-b and the inter-e-b output voltage V e-b. Then, the main IGBT and the auxiliary IGBT are controlled in the manner of being switched with each other. Consequently, when the inter-e-b voltage V e-b is higher than the maximum value of the inter-a-b voltage V a-b, the unidirectional DC-DC converter is driven in the boost mode alone.

Incidentally, if the auxiliary IGBT 104 is of reverse-withstand-pressure blocking type, the inversely-parallel diode 112 can be omitted.

In this way, the present embodiment is configured as follows: The unidirectional DC-DC converter is preconditioned which includes the DC power-supply (1 to 4), the buck converter circuit, the buck converter circuit including the first main switching element 101 for intermittently intercepting and connecting the current flowing into the DC load 118 via the main inductor 114 from the DC power-supply (1 to 4), and the boost converter circuit, the boost converter circuit including the second main switching element 103 for short-circuiting the DC load 118, and intermittently intercepting and connecting the current in the circuit for accumulating the energy into the main inductor 114 from the DC power-supply (1 to 4). Here, the first and second snubber capacitors 109 and 119 and the first and second inversely-parallel diodes 107 and 111 are connected in parallel to the first and second main switching elements 101 and 103 each. Moreover, the unidirectional DC-DC converter includes the control device (driving circuit) 120 for turning ON/OFF the first and second main switching elements 101 and 103, and controlling duties of the main switching elements 101 and 103, and the output diode 105 for releasing the energy onto the load side by the ON/OFF operation of the main switching elements 101 and 103, the energy being accumulated into the main inductor 114. Here, the unidirectional DC-DC converter further includes the DC circuit of the first auxiliary switching element 102, the diode 110, and the first auxiliary inductor 115, the first auxiliary inductor 115 being loosely coupled to the main inductor 114 magnetically, the DC circuit being connected in parallel to the first main switching element 101. Meanwhile, the unidirectional DC-DC converter further includes the DC circuit of the second auxiliary inductor 116, the diode 113, and the second auxiliary switching element 104, the second auxiliary inductor 116 being loosely coupled to the main inductor 114 magnetically, the DC circuit being connected in parallel to the second main switching element 103.

According to the present embodiment, there is provided with the soft switching circuit including the auxiliary inductors 115 and 116, the auxiliary IGBTs 102 and 104, the diodes 110 and 113, and the snubber capacitors 109 and 119. This soft switching circuit allows implementation of the ZVS turn-ON, ZCS turn-ON, and ZVS turn-OFF over a wide voltage control range, thereby making it possible to reduce the switching loss tremendously. Namely, it becomes possible to reduce the switching loss tremendously. This feature also allows implementation of the high frequency, and also allows implementation of the downsizing and cost reduction in the auxiliary inductors and capacitors.

Figure 5:
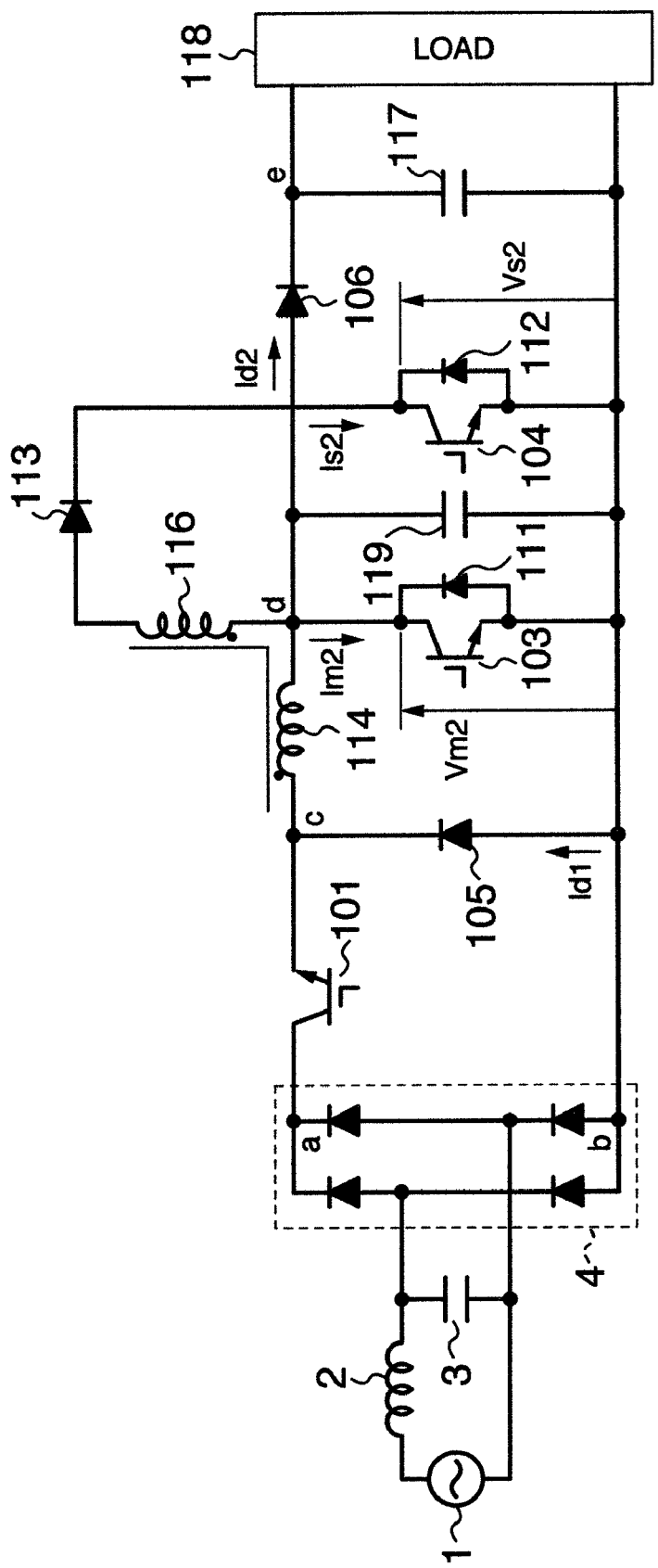
FIG. 5 is a diagram for illustrating a modified embodiment 1 of the main circuit of the unidirectional DC-DC converter according to the first embodiment of the present invention.

FIG. 5, which illustrates a modified embodiment 1 of the first embodiment of the present invention, is a main-circuit configuration diagram of a unidirectional DC-DC converter. The present embodiment is also the soft-switching unidirectional DC-DC converter of buck-boost type.

In FIG. 5, the same reference numerals are affixed to the same configuration components as the ones illustrated in FIG. 1, and thus the overlapped explanation will be avoided.

The present modified embodiment 1 is configured such that the soft switching auxiliary circuit is added to the boost converter unit alone, when the output voltage is controlled in a range higher than the maximum-value proximity (about 141 V at AC 100 V, about 282 V at AC 200 V) to the commercial power-supply. Its operation is quite similar to the operation in the boost mode in the first embodiment.

Figure 6:
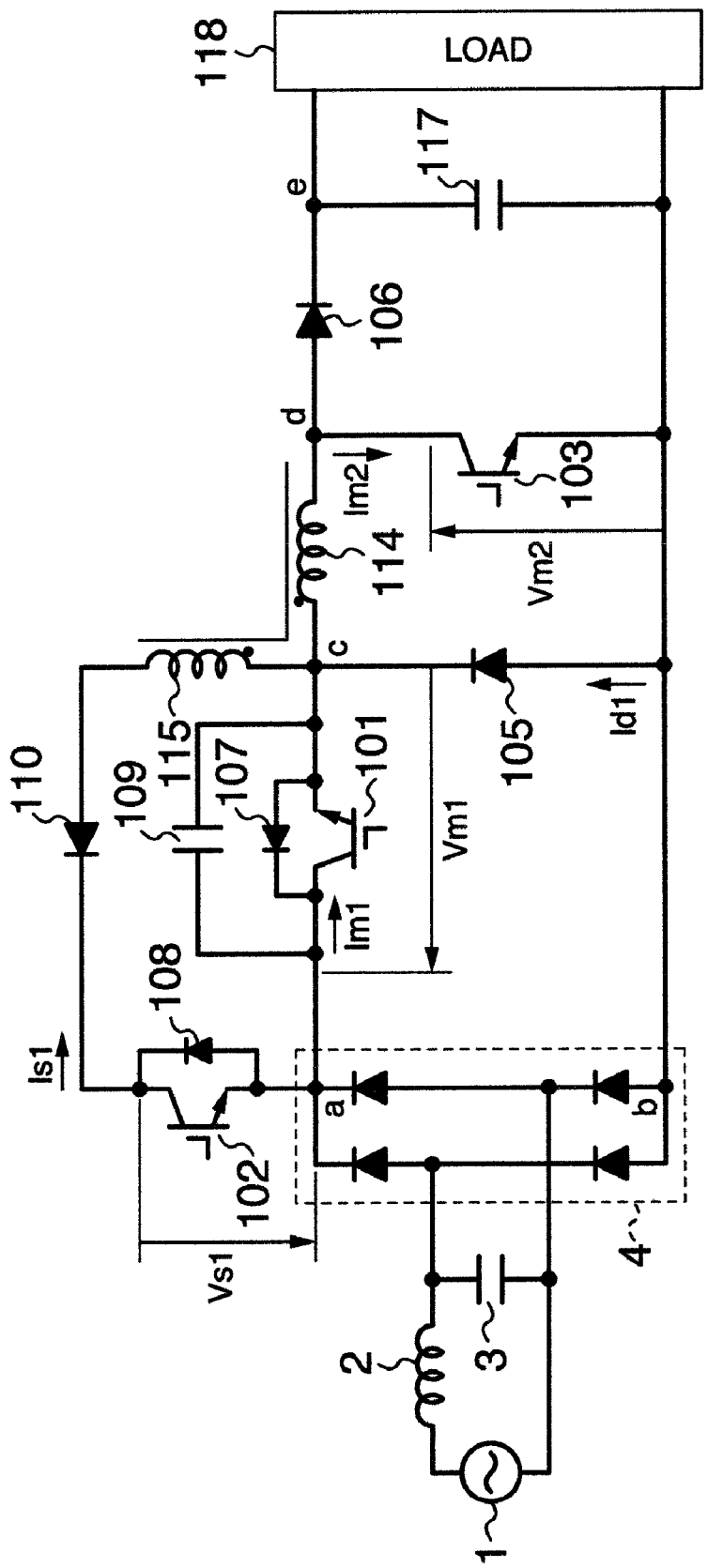
FIG. 6 is a diagram for illustrating a modified embodiment 2 of the main circuit of a unidirectional DC-DC converter according to a fourth embodiment of the present invention.

FIG. 6, which illustrates a modified embodiment 2 of the first embodiment of the present invention, is a main-circuit configuration diagram of a unidirectional DC-DC converter. The present embodiment is also the soft-switching unidirectional DC-DC converter of buck-boost type. In FIG. 6, the same reference numerals are affixed to the same configuration components as the ones illustrated in FIG. 1, and thus the overlapped explanation will be avoided.

The present modified embodiment 2 is configured such that the soft switching auxiliary circuit is added to the buck converter unit alone, when the output voltage is controlled in a range lower than one-half of the pulse-height value (about 70 V or less at AC 100 V, about 141 V or less at AC 200 V) of the commercial power-supply. Its operation is quite similar to the operation in the buck mode in the first embodiment.

The modified embodiments 1 and 2 become effective when the output voltage range is narrow, and allow implementation of the downsizing and high frequency.

2nd Embodiment

Next, referring to FIG. 7 and FIG. 8, the explanation will be given below concerning a second embodiment of the present invention.

Figure 7:
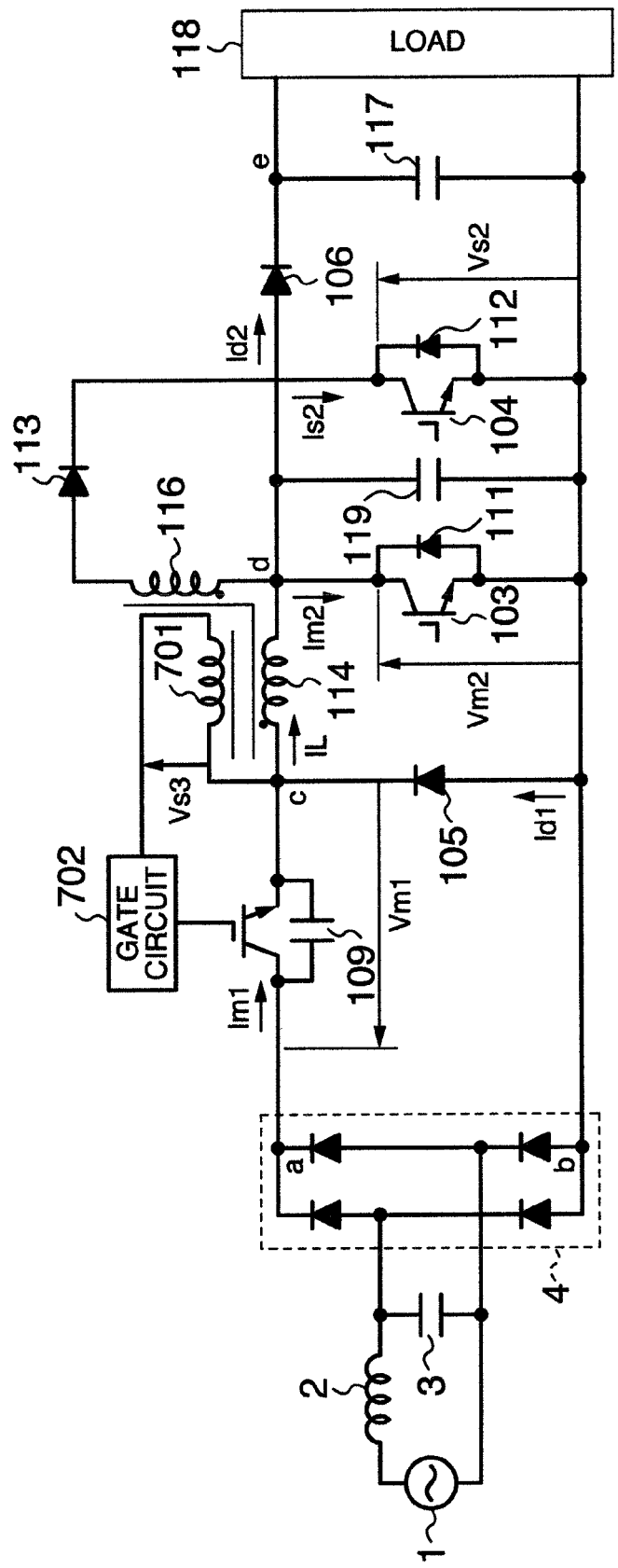
FIG. 7 is a configuration diagram of the main circuit of a unidirectional DC-DC converter according to a second embodiment of the present invention.

FIG. 7 is a configuration diagram of the main circuit of a unidirectional DC-DC converter according to the second embodiment of the present invention. The present embodiment is a unidirectional DC-DC converter of buck-boost type for allowing implementation of both the boost operation for outputting a voltage higher than an inputted voltage and the buck operation for outputting a voltage lower than the inputted voltage.

Figure 8:
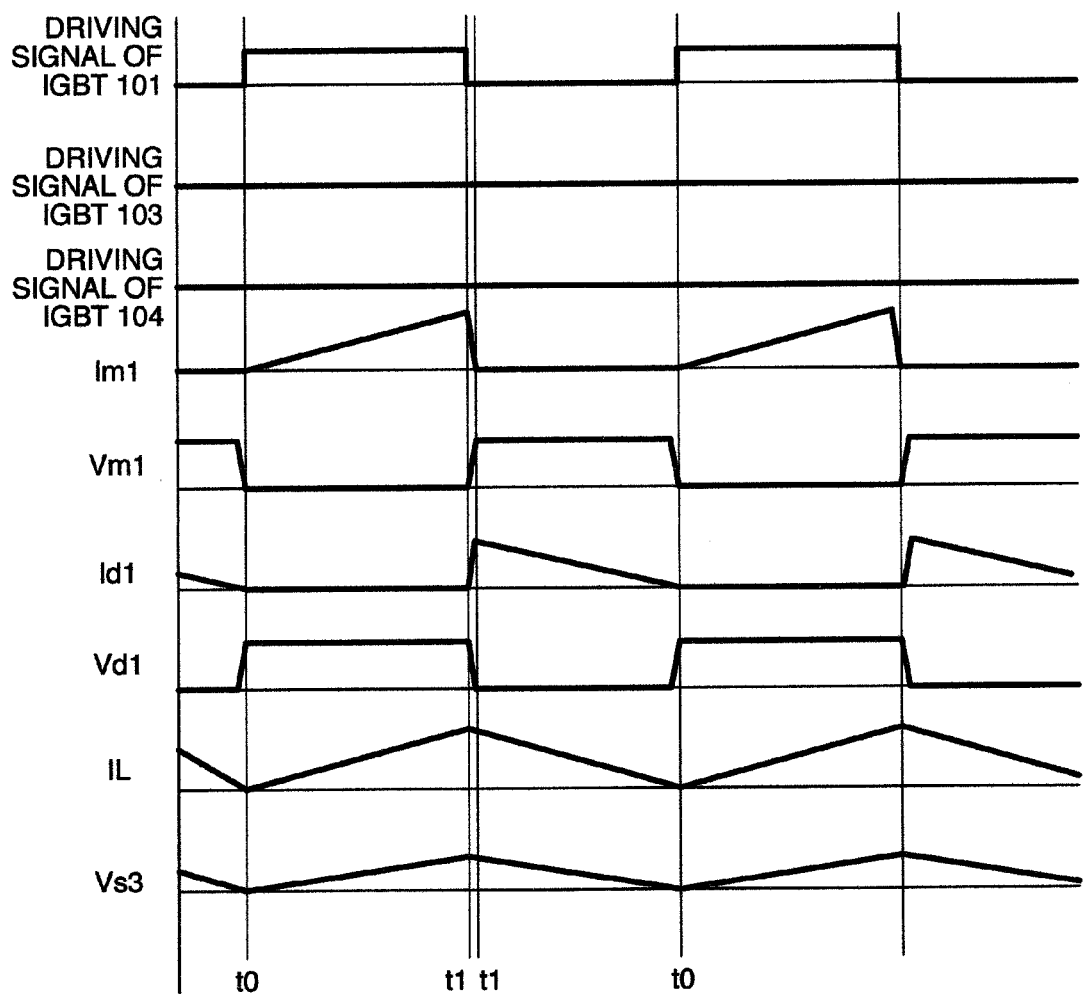
FIG. 8 is an input/output voltage waveform diagram for explaining operation of the second embodiment of the present invention.

In FIG. 8, the same reference numerals are affixed to the same configuration components as the ones illustrated in FIG. 1, and thus the overlapped explanation will be avoided.

The point in which the present embodiment differs from the first embodiment is a driving method for driving the main IGBT 101, i.e., the first main switching element. The configuration of this driving method is as follows: A point-in-time at which a current flowing through the main inductor 114 becomes equal to zero is detected by an auxiliary inductor 701 which is magnetically coupled to the main inductor 114. Then, the main IGBT 101 is turned ON at this point-in-time. As the circuit configuration, the auxiliary inductor 701 which is magnetically coupled to the main inductor 114 is connected from an e point. Moreover, an output terminal of the auxiliary inductor 701 is connected to a gate circuit 702 for driving the main IGBT 101.

Next, the explanation will be given below regarding the operation. The operation in the boost mode is completely the same as the one illustrated in FIG. 4. Namely, the main IGBT 103 is turned ON during the time-period in which the current is passing trough the inversely-parallel diode 111. This operation allows implementation of the ZVS and the ZCS, thereby preventing the turn-ON switching loss from occurring. Also, at the time of the turn-OFF of the main IGBT 103, the snubber capacitor 119 makes it possible to moderate and relax dv/dt of the inter-collector-emitter voltage of the main IGBT 103. This allows implementation of the ZVS, thereby making it possible to reduce the turn-OFF loss. Meanwhile, in the turn-OFF of the auxiliary IGBT 104, no turn-OFF loss occurs. This is because no current is flowing in the auxiliary IGBT 104.

Next, referring to FIG. 8, the explanation will be given below regarding the operation in the buck mode. Prior to a point-in-time t0, no driving signal is applied to the gate of the first main IGBT 101. Accordingly, both of the IGBTs are in the OFF states. At the point-in-time t0, when the current value in the main inductor 114 becomes equal to zero, a zero volt occurs at the output terminal of the auxiliary inductor 701. In response thereto, a driving signal of the main IGBT 101 is turned ON. As a result of this, a current flows along a loop of the main inductor 114→the output diode 106→the output capacitor 117→the rectifier circuit 4→the main IGBT 101→the main inductor 114. The current which is going to flow through the main IGBT 101 flows from the zero current. Accordingly, the main IGBT 101 finds it possible to implement the ZVS turn-ON and ZCS turn-ON. Consequently, there occurs none of the switching loss which will accompany the turn-ON of the main IGBT 101.

At a point-in-time t1, the gate driving signal of the main IGBT 101 is turned OFF. When the current flowing in the main IGBT 101 is intercepted, a current flows from the DC power-supply to the snubber capacitor 109 and the main inductor 114 during a time-period from the point-in-time t1 to a point-in-time t2. As a result, the inter-collector-emitter voltage of the main IGBT 101 is raised by dv/dt which is determined by the capacity of the snubber capacitor 109 and the intercepted current value. Namely, the snubber capacitor 109 makes it possible to moderate and relax dv/dt of the inter-collector-emitter voltage of the main IGBT 101. This allows implementation of the ZVS, thereby making it possible to reduce the turn-OFF loss. When the snubber capacitor 109 is charged up to the power-supply voltage, the energy accumulated into the main inductor 114 flows a current along a loop of the main inductor 114→the output diode 106→the output capacitor 117→the diode 105. On account of this, this current is charged into the output capacitor 117

In this way, the zero point of the current flowing through the main inductor 114 is detected, and the main IGBT 101 is controlled in response thereto. This operation mode is referred to as "critical mode". As explained above, providing the zero-current detection circuit for the main inductor 114 allows implementation of the soft switching.

3rd Embodiment

Next, referring to FIG. 9 and FIG. 10, the explanation will be given below concerning a third embodiment of the present invention.

Figure 9:
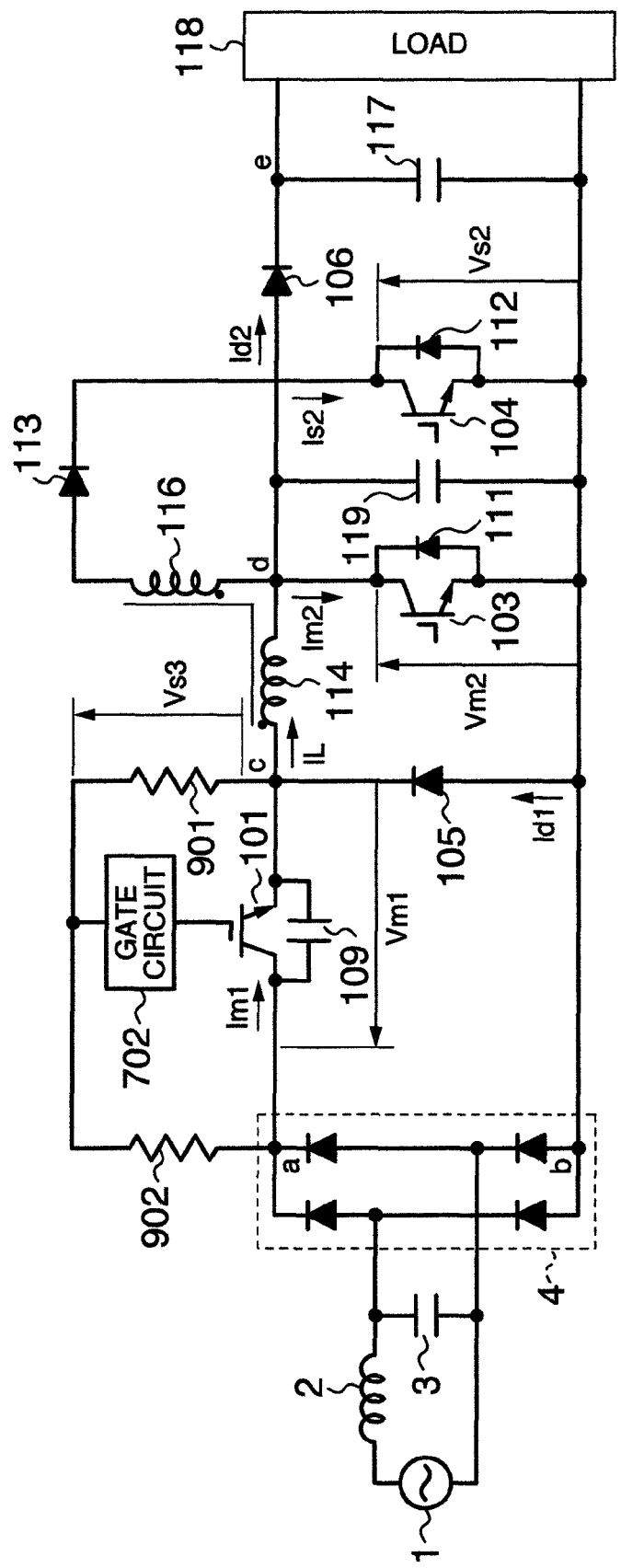
FIG. 9 is a configuration diagram of the main circuit of a unidirectional DC-DC converter according to a third embodiment of the present invention.
Figure 10:
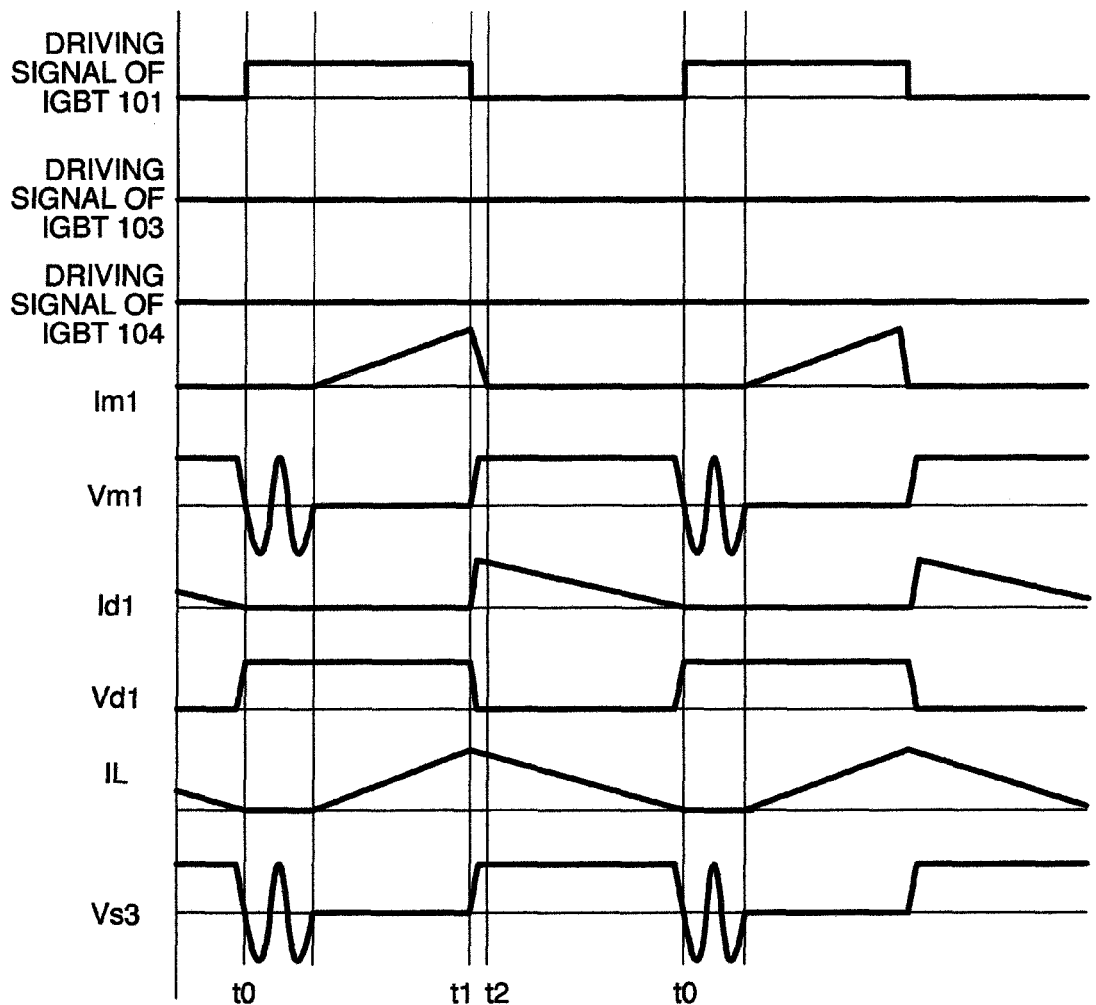
FIG. 10 is an input/output voltage waveform diagram for explaining operation of the third embodiment of the present invention.

FIG. 9 is a configuration diagram of the main circuit of a unidirectional DC-DC converter according to the third embodiment of the present invention. The present embodiment is a unidirectional DC-DC converter of buck-boost type for allowing implementation of both the boost operation for outputting a voltage higher than an inputted voltage and the buck operation for outputting a voltage lower than the inputted voltage.

In FIG. 9, the same reference numerals are affixed to the same configuration components as the ones illustrated in FIG. 1, and thus the overlapped explanation will be avoided.

The point in which the present embodiment differs from the first embodiment is a driving method for driving the main IGBT 101, i.e., the first main switching element. The configuration of this driving method is as follows: A point-in-time is detected at which the inter-collector-emitter voltage of the main IGBT 101 becomes equal to a zero voltage or lower. Then, the main IGBT 101 is turned ON at this point-in-time. As the circuit configuration, a DC circuit of a resistor 901 and a resistor 902 is connected between the a-c points. Moreover, the connection is established from a connection point of the resistor 901 and the resistor 902 to the gate circuit 702 for driving the main IGBT 101.

Next, the explanation will be given below regarding the operation. The operation in the boost mode is completely the same as the one illustrated in FIG. 4. Namely, the main IGBT 103 is turned ON during the time-period in which the current is passing trough the inversely-parallel diode 111. This operation allows implementation of the ZVS and the ZCS, thereby preventing the turn-ON switching loss from occurring. Also, at the time of the turn-OFF of the main IGBT 103, the snubber capacitor 119 makes it possible to moderate and relax dv/dt of the inter-collector-emitter voltage of the main IGBT 103. This allows implementation of the ZVS, thereby making it possible to reduce the turn-OFF loss. Meanwhile, in the turn-OFF of the auxiliary IGBT 104, no turn-OFF loss occurs. This is because no current is flowing in the auxiliary IGBT 104.

Next, referring to FIG. 10, the explanation will be given below regarding the operation in the buck mode. Prior to a point-in-time t0, no driving signal is applied to the gate of the first main IGBT 101. Accordingly, both of the IGBTs are in the OFF states. At the point-in-time t0, when it is detected by the gate circuit 702 that occurrence voltage in the resistor 901 becomes equal to zero volt, a driving signal of the main IGBT 101 is turned ON. As a result of this, a current flows along the loop of the main inductor 114→the output diode 106→the output capacitor 117→the rectifier circuit 4→the main IGBT 101. The current which is going to flow through the main IGBT 101 flows from the zero current. Accordingly, the main IGBT 101 finds it possible to implement the ZVS turn-ON and ZCS turn-ON. Consequently, there occurs none of the switching loss which will accompany the turn-ON of the main IGBT 101.

At a point-in-time t1, the gate driving signal of the main IGBT 101 is turned OFF. When the current flowing in the main IGBT 101 is intercepted, a current flows from the DC power-supply to the snubber capacitor 109 and the main inductor 114 during a time-period from the point-in-time t1 to a point-in-time t2. As a result, the inter-collector-emitter voltage of the main IGBT 101 is raised by dv/dt which is determined by the capacity of the snubber capacitor 109 and the intercepted current value. Namely, the snubber capacitor 109 makes it possible to moderate and relax dv/dt of the inter-collector-emitter voltage of the main IGBT 101. This allows implementation of the ZVS, thereby making it possible to reduce the turn-OFF loss. When the snubber capacitor 109 is charged up to the power-supply voltage, the energy accumulated into the main inductor 114 flows a current along the loop of the main inductor 114→the output diode 106→the output capacitor 117→the diode 105→the main inductor 114. On account of this, this current is charged into the output capacitor 117

In the foregoing description, the explanation has been given concerning the soft switching operation in the current discontinuous mode. Detecting the occurrence voltage in the resistor 901 instantaneously, however, allows implementation of the soft switching operation in the critical mode as well.

In the above-described embodiments, the explanation has been given selecting, as the central subjects, the examples where the IGBTs are employed as the switching elements. It is apparent for those skilled in the art, however, that the unidirectional DC-DC converter according to the present invention can employ not only the IGBTs, but also elements such as power MOSFETs, the other insulating gate semiconductor devices, and bipolar transistors, and that the converter can obtain basically the same effects.

It should be further understood by those skilled in the art that, although the foregoing description has been made on embodiments of this invention, the invention is not limited thereto, and various changes and modifications may be made without departing from the spirit of the invention and the scope of the appended claims.

The invention claimed is:

1. A unidirectional DC-DC converter, comprising:
    a DC power-supply,
    a buck converter circuit, said buck converter circuit including a first main switching element for intermittently intercepting and connecting a current flowing into a DC load via a main inductor from said DC power-supply,
    a boost converter circuit, said boost converter circuit including a second main switching element for short-circuiting said DC load, and intermittently intercepting and connecting a current in a circuit for accumulating energy into said main inductor from said DC power-supply,
    first snubber capacitor connected in parallel to said first and second main switching element,
    first inversely-parallel diode connected in inversely parallel to said second main switching element,
    a control device for turning ON/OFF said second main switching element, and controlling duties of said main switching element, and
    an output diode for releasing said energy onto said load side by said ON/OFF operation of said first and second main switching elements, said energy being accumulated into said main inductor, said unidirectional DC-DC converter further comprising:
    first and second auxiliary inductors which are coupled to said main inductor magnetically,
    a drive circuit for detecting generation voltage of first auxiliary inductor for controlling ON/OFF said first switching element, and
    a first auxiliary switching element for flowing forward direction current into said first inversely parallel diode during a short time-period including a point-in-time for turning ON said second main switching element, utilizing energy stored in said second auxiliary inductor.

2. The unidirectional DC-DC converter according to claim 1, wherein
said second auxiliary inductor is loosely coupled to said main inductor magnetically.

3. The unidirectional DC-DC converter according to claim 1, further comprising:
control means for turning ON said first auxiliary switching elements element during said short time-period including said point-in-time at which said corresponding second main switching elements are to be turned ON, and flowing said forward-direction current through said corresponding first inversely-parallel diode.

4. The unidirectional DC-DC converter according to claim 1, further comprising:
control means for turning ON said first auxiliary switching elements immediately before turning ON said corresponding second main switching element.

5. The unidirectional DC-DC converter according to claim 1, wherein
said first main switching element is turned ON if terminal voltage of said first auxiliary inductor falls to a predetermined voltage, and said first main switching element is turned OFF if said terminal voltage of said first auxiliary inductor rises to a predetermined voltage.

6. A unidirectional DC-DC converter comprising:
a DC power supply,
a buck converter circuit, said buck converter circuit including a first main switching element for intermittently intercepting and connecting a current flowing into a DC load via a main inductor from said DC power-supply,
a boost converter circuit, said boost converter circuit including a second main switching element for short-circuiting said DC load, and intermittently intercepting and connecting a current in a circuit for accumulating energy into said main inductor from said DC power supply,
first snubber capacitor connected in parallel to said first main switching element,
first inversely-parallel diode connected in inversely parallel to said second main switching element,
a control device for turning ON/OFF said second main switching element, and controlling duties of said main switching element, and
an output diode for releasing said energy onto said load side by said ON/OFF operation of said first and second main switching elements, said energy being accumulated into said main inductor, further comprising
first auxiliary inductor which is magnetically coupled to said main inductor, and serial circuit composed of a first auxiliary switching element connected in parallel to said second main switching element and a second auxiliary inductor which is magnetically coupled to said main inductor,
wherein said first main switching element is turned ON if terminal voltage of said first auxiliary inductor falls to a predetermined voltage, and said first main switching element is turned OFF if said terminal voltage of said first auxiliary inductor rises to a predetermined voltage.

* * * * *